(12) United States Patent
Sugimoto et al.

(10) Patent No.: US 8,893,756 B2
(45) Date of Patent: *Nov. 25, 2014

(54) POLYMER SHEET FOR INNER LINER AND PNEUMATIC TIRE USING THE SAME

(75) Inventors: Mutsuki Sugimoto, Kobe (JP); Ryuichi Tokimune, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 395 days.

This patent is subject to a terminal disclaimer.

(21) Appl. No.: 13/166,293

(22) Filed: Jun. 22, 2011

(65) Prior Publication Data

US 2012/0006459 A1    Jan. 12, 2012

(30) Foreign Application Priority Data

Jul. 7, 2010 (JP) ................................. 2010-155120
Oct. 13, 2010 (JP) ................................. 2010-230367

(51) Int. Cl.
*B60C 5/14* (2006.01)
*B60C 1/00* (2006.01)

(52) U.S. Cl.
USPC ....................................................... 152/510

(58) Field of Classification Search
None
See application file for complete search history.

(56) References Cited

U.S. PATENT DOCUMENTS

| | | | |
|---|---|---|---|
| 4,910,321 A | 3/1990 | Kennedy et al. | |
| 4,946,899 A | 8/1990 | Kennedy et al. | |
| 5,219,948 A | 6/1993 | Storey et al. | |
| 5,576,372 A * | 11/1996 | Kresge et al. | 524/442 |
| 8,616,255 B2 * | 12/2013 | Sugimoto | 152/510 |
| 2008/0249236 A1 | 10/2008 | Nakashima et al. | |
| 2010/0175804 A1 | 7/2010 | Lesage et al. | |
| 2010/0263778 A1 | 10/2010 | Lesage et al. | |
| 2011/0011511 A1 | 1/2011 | Miyazaki et al. | |
| 2011/0056604 A1 | 3/2011 | Sugimoto | |
| 2011/0061782 A1 | 3/2011 | Merino Lopez et al. | |
| 2011/0277901 A1 * | 11/2011 | Lesage et al. | 152/510 |
| 2012/0003413 A1 * | 1/2012 | Lesage et al. | 428/36.6 |

FOREIGN PATENT DOCUMENTS

| | | |
|---|---|---|
| EP | 1 837 384 A1 | 9/2007 |
| EP | 2 258 770 A1 | 12/2010 |
| FR | 2 928 299 A1 | 9/2009 |
| FR | 2938546 * | 5/2010 |
| FR | 2939076 * | 6/2010 |
| JP | 62-048704 A | 3/1987 |
| JP | 64-062308 A | 3/1989 |

(Continued)

OTHER PUBLICATIONS

Machine translation of JP 2010-100082, 2010.*

(Continued)

*Primary Examiner* — Justin Fischer
(74) *Attorney, Agent, or Firm* — Birch, Stewart, Kolasch & Birch, LLP

(57) ABSTRACT

Provided is a pneumatic tire which exhibits excellent performance in flex crack growth resistance, rolling resistance and static air pressure drop, and includes an SIBS layer containing a styrene-isobutylene-styrene triblock copolymer as a polymer sheet used for an inner liner. The SIBS layer has a thickness more than or equal to 0.05 mm and less than or equal to 0.6 mm. The SIBS layer contains more than or equal to 0.5% by mass and less than or equal to 40% by mass of a polymer obtained by polymerization of a monomer unit having 4 carbon atoms.

11 Claims, 2 Drawing Sheets

(56) References Cited

FOREIGN PATENT DOCUMENTS

| | | |
|---|---|---|
| JP | 03-174403 A | 7/1991 |
| JP | 09-165469 A | 6/1997 |
| JP | 10-110086 A | 4/1998 |
| JP | 2008-168648 A | 7/2008 |
| JP | 2010-13646 A | 1/2010 |
| JP | 2010-100082 A | 5/2010 |
| JP | 2010-100675 A | 5/2010 |
| JP | 2011-51320 A | 3/2011 |
| JP | 2012-510389 A | 5/2012 |
| WO | WO 2005/033035 A1 | 4/2005 |
| WO | WO 2007/145851 A2 | 12/2007 |
| WO | WO 2008/145276 A1 | 12/2008 |
| WO | WO 2009/007064 A1 | 1/2009 |
| WO | WO 2009/119232 A1 | 10/2009 |
| WO | WO 2010/063427 A1 | 6/2010 |

OTHER PUBLICATIONS

Japanese Office Action dated May 29, 2012, for Application No. 2010-230367 with the English translation.

Japanese Office Action for Japanese Application No. 2010-230367 mailed Mar. 19, 2013.

* cited by examiner

POLYMER SHEET FOR INNER LINER AND PNEUMATIC TIRE USING THE SAME

This nonprovisional application is based on Japanese Patent Application No. 2010-155120 filed on Jul. 7, 2010 and No. 2010-230367 filed on Oct. 13, 2010 with the Japan Patent Office, the entire contents of which are hereby incorporated by reference.

BACKGROUND OF THE INVENTION

1. Field of the Invention

The present invention relates to a polymer sheet for an inner liner and a pneumatic tire using the same.

2. Description of the Background Art

Recently, an attempt has been made to perform weight saving of tires because of strong social demands for fuel economy of automobiles. An attempt has also been made to perform weight saving of inner liners, among tire members, that are disposed at a tire radial inner side and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl-based rubber containing 70 to 100% by mass of a butyl rubber and 30 to 0% by mass of a natural rubber. The butyl-based rubber contains, in addition to butylene, about 1% by mass of isoprene that enables co-crosslinking with an adjacent rubber along with sulfur, a vulcanization accelerator and zinc white. In the case of a conventional formulation, the butyl-based rubber requires a thickness of 0.6 to 1.0 mm for tires for passenger cars, or a thickness of about 1.0 to 2.0 mm for tires for trucks and buses.

In order to perform weight saving of tires, it has been proposed to use, as an inner liner, a thermoplastic elastomer that has excellent air permeation resistance as compared with the butyl-based rubber and can decrease the thickness of an inner liner layer. However, the thermoplastic elastomer that shows high air permeation resistance with a smaller thickness than that of the butyl-based rubber is inferior in vulcanization adhesive strength with an insulation or carcass rubber adjacent to the inner liner as compared with the butyl-based rubber. When the inner liner has low vulcanization adhesive strength, an air-in phenomenon occurs in which air permeates into the space between the inner liner and the insulation or the carcass, and thus a number of small air bubbles appear. This phenomenon is not particularly disadvantageous for tire performance, but raises a problem that a small spot pattern formed inside tires gives an impression of poor appearance to users.

Japanese Patent Laying-Open No. 09-165469 (Patent Document 1) proposes a pneumatic tire capable of improving adhesion between an inner liner and a rubber composition that forms the inner surface of the tire or the carcass layer by forming an inner liner layer using nylon having low air permeability. However, in the technique of Patent Document 1, there is a problem that a rubber cement composed of a rubber composition must be bonded to a nylon film having been subjected to an RFL treatment so as to form a nylon film layer, resulting in complicated steps. Furthermore, in the vulcanization step, there is usually employed a tire vulcanization method in which a bladder body is inserted into an unvulcanized tire (green tire) held in a mold and the bladder body is expanded, and then vulcanization molding is performed by pressing the tire against the inner surface of the mold from the inside of the unvulcanized tire. In the inner liner layer of Patent Document 1, the inner liner layer composed of the nylon film layer is brought into contact with the bladder in a heated state, and therefore the inner liner layer is adhered and bonded to the bladder. Thus, there arises a problem that, when the vulcanized tire is removed from the mold, the inner liner layer bonded to the bladder is taken away to the bladder side, resulting in the air-in phenomenon between the inner liner layer and the insulation or carcass.

SUMMARY OF THE INVENTION

An object of the present invention is to provide a thin polymer sheet for an inner liner that, when used for an inner liner part, allows a pneumatic tire to be produced which exhibits excellent performance in flex crack growth resistance, rolling resistance and static air pressure drop, and to provide a pneumatic tire using such polymer sheet.

The present invention is directed to a polymer sheet for an inner liner, including an SIBS layer containing a styrene-isobutylene-styrene triblock copolymer, the SIBS layer having a thickness more than or equal to 0.05 mm and less than or equal to 0.6 mm, the SIBS layer containing more than or equal to 0.5% by mass and less than or equal to 40% by mass of a polymer obtained by polymerization of a monomer unit having 4 carbon atoms.

The present invention is directed to a polymer sheet for an inner liner, including an SIBS layer containing a styrene-isobutylene-styrene triblock copolymer, and at least one of an SIS layer containing a styrene-isoprene-styrene triblock copolymer, and an SIB layer containing a styrene-isobutylene diblock copolymer, the SIBS layer having a thickness more than or equal to 0.05 mm and less than or equal to 0.6 mm, the SIS layer and the SIB layer having a total thickness more than or equal to 0.01 mm and less than or equal to 0.3 mm, and the SIBS layer, and at least one of the SIS layer and the SIB layer containing more than or equal to 0.5% by mass and less than or equal to 40% by mass of a polymer obtained by polymerization of a monomer unit having 4 carbon atoms.

Preferably, in the polymer sheet for an inner liner in accordance with the present invention, the polymer obtained by polymerization of a monomer unit having 4 carbon atoms is composed of at least one of polybutene and polyisobutylene.

Preferably, in the polymer sheet for an inner liner in accordance with the present invention, the polymer obtained by polymerization of a monomer unit having 4 carbon atoms satisfies at least one of a number-average molecular weight more than or equal to 300 and less than or equal to 3,000, a weight-average molecular weight more than or equal to 700 and less than or equal to 100,000, and a viscosity-average molecular weight more than or equal to 20,000 and less than or equal to 70,000.

Preferably, in the polymer sheet for an inner liner in accordance with the present invention, the styrene-isobutylene-styrene triblock copolymer has a weight-average molecular weight more than or equal to 50,000 and less than or equal to 400,000 and a styrene unit content more than or equal to 10% by mass and less than or equal to 30% by mass.

Preferably, in the polymer sheet for an inner liner in accordance with the present invention, the styrene-isoprene-styrene triblock copolymer has a weight-average molecular weight more than or equal to 100,000 and less than or equal to 290,000 and a styrene unit content more than or equal to 10% by mass and less than or equal to 30% by mass.

Preferably, in the polymer sheet for an inner liner in accordance with the present invention, the styrene-isobutylene diblock copolymer is linear and has a weight-average molecular weight more than or equal to 40,000 and less than or equal to 120,000 and a styrene unit content more than or equal to 10% by mass and less than or equal to 35% by mass.

The present invention is also directed to a pneumatic tire with the polymer sheet for an inner liner used for an inner liner part.

Preferably, in the pneumatic tire in accordance with the present invention, the SIBS layer is arranged at a radial innermost side of the pneumatic tire.

Preferably, in the pneumatic tire in accordance with the present invention, one of the SIS layer containing the polymer obtained by polymerization of a monomer unit having 4 carbon atoms and the SIB layer containing the polymer obtained by polymerization of a monomer unit having 4 carbon atoms is arranged in contact with a carcass layer of the pneumatic tire.

The present invention can provide a thin polymer sheet for an inner liner that, when used for an inner liner part, allows a pneumatic tire to be produced which exhibits excellent performance in flex crack growth resistance, rolling resistance and static air pressure drop, and provide a pneumatic tire using such polymer sheet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Pneumatic Tire>

Figure 1:
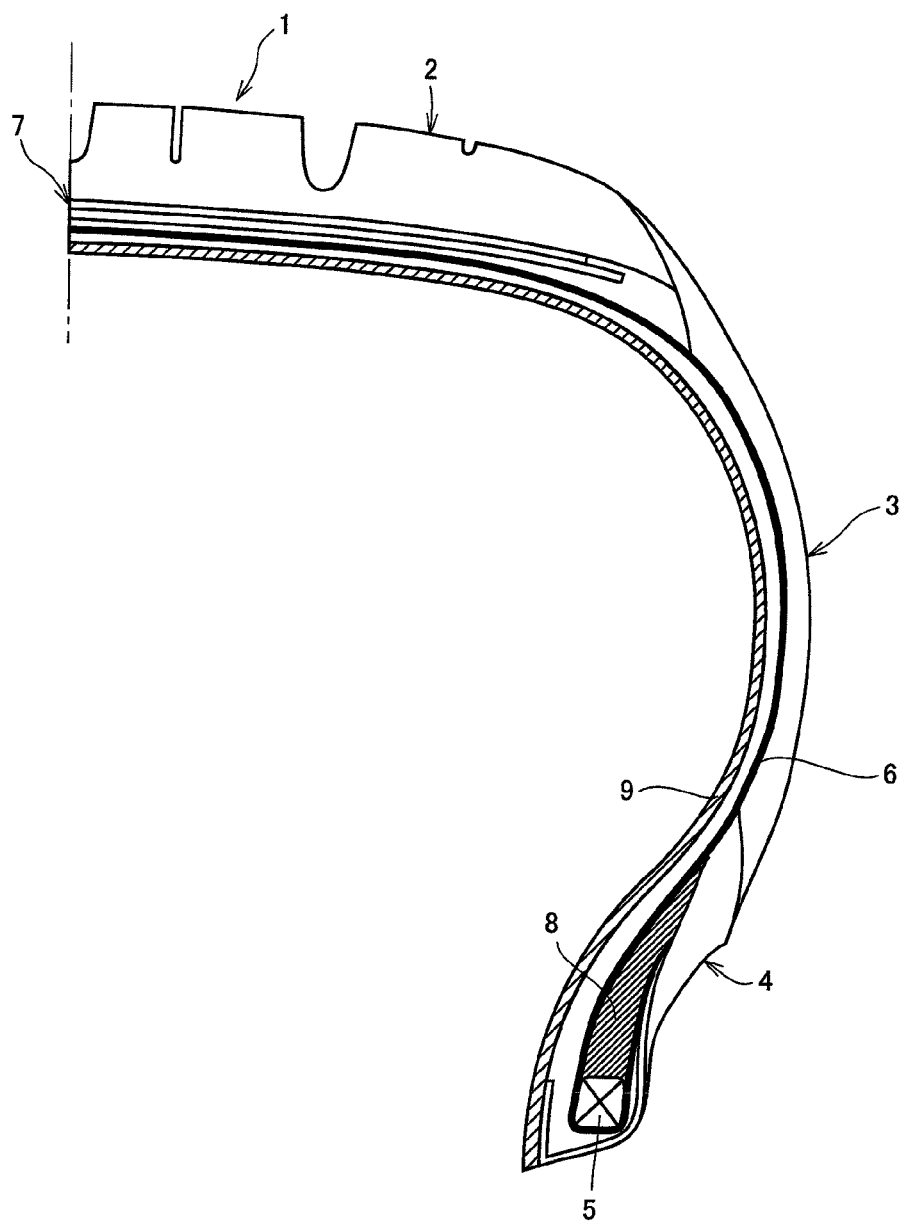
FIG. 1 is a schematic sectional view showing the right half of a pneumatic tire in accordance with one embodiment of the present invention.

A structure of a pneumatic tire of one embodiment of the present invention will be described with reference to FIG. 1.

A pneumatic tire 1 can be used as tires for passenger cars, trucks and buses, and heavy-duty equipment. Pneumatic tire 1 includes a tread part 2, a sidewall part 3 and a bead part 4. Further, a bead core 5 is embedded in bead part 4. Also provided are a carcass 6 arranged to extend from one bead part 4 to the other bead part with each of opposite ends being folded back to latch bead core 5, and a belt layer 7 composed of two plies outside a crown part of carcass 6. An inner liner 9 extending from one bead part 4 to the other bead part 4 is disposed on the tire radial inner side of carcass 6. The two plies of belt layer 7, each being made of a steel cord or a cord of aramid fiber or the like, are arranged so that the cords intersect with each other and each form an angle of usually 5 to 30° with respect to a tire circumferential direction. Regarding the carcass, organic fiber cords made of polyester, nylon, aramid or the like are arranged at an angle of about 90° with respect to the tire circumferential direction, and a bead apex 8 extending from the top of bead core 5 toward the sidewall is disposed in a region surrounded by the carcass and the folded part thereof. It is to be noted that an insulation may be disposed between inner liner 9 and carcass 6.

In one embodiment of the present invention, inner liner 9 is made of a polymer sheet for an inner liner.

<Polymer Sheet for Inner Liner>
[First Embodiment]

Figure 2:
FIGS. 2 to 6 are schematic sectional views each showing a polymer sheet for an inner liner in accordance with one embodiment of the present invention.

A structure of a polymer sheet for an inner liner of a first embodiment of the present invention will be described with reference to FIG. 2.

A polymer sheet 10a for an inner liner has an SIBS layer 11a containing a styrene-isobutylene-styrene triblock copolymer (hereinafter also referred to as SIBS). SIBS layer 11a contains more than or equal to 0.5% by mass and less than or equal to 40% by mass of a polymer obtained by polymerization of a monomer unit having 4 carbon atoms.

(Styrene-Isobutylene-Styrene Triblock Copolymer)

Because of an isobutylene block of an SIBS, a polymer sheet containing the SIBS has excellent air permeation resistance. Therefore, when a polymer sheet containing an SIBS is used as an inner liner, a pneumatic tire having excellent air permeation resistance can be obtained.

Further, the SIBS has excellent durability since a molecular structure other than those of aromatic molecules is completely saturated and therefore deterioration and hardening are suppressed. Therefore, when a polymer sheet containing the SIBS is used as the inner liner, a pneumatic tire having excellent durability can be obtained.

When a pneumatic tire is produced by using a polymer sheet containing the SIBS as the inner liner, a halogenated rubber having high specific gravity, which has hitherto been used so as to impart air permeation resistance, such as a halogenated butyl rubber, is not used since air permeation resistance is ensured by the addition of the SIBS. Even if the halogenated rubber is used, the amount of use can be reduced. This enables weight saving of the tire and achieves the effect of improving fuel efficiency.

Although there is no particular limitation on the molecular weight of the SIBS, the weight-average molecular weight obtained by a GPC measurement is preferably more than or equal to 50,000 and less than or equal to 400,000 in view of fluidity, the molding step and rubber elasticity. When the weight-average molecular weight is less than 50,000, tensile strength and tensile elongation may decrease. When the weight-average molecular weight is more than 400,000, extrusion moldability may deteriorate. Therefore, both the cases are not preferred.

The SIBS usually contains more than or equal to 10% by mass and less than or equal to 40% by mass of a styrene unit. Since air permeation resistance and durability become more satisfactory, the content of the styrene unit in the SIBS is preferably more than or equal to 10% by mass and less than or equal to 30% by mass.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, and preferably from about 5,000 to 30,000 for a styrene block, in view of the rubber elasticity and handling (a polymer of a polymerization degree less than 10,000 is a liquid).

The SIBS can be obtained by a conventional polymerization method of a vinyl-based compound and, for example, can be obtained by a living cationic polymerization method.

Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and therefore has higher stability to ultraviolet rays than a polymer having a double bond in the molecule, such as polybutadiene, resulting in satisfactory weatherability.

(Polymer Obtained by Polymerization of Monomer Unit Having 4 Carbon Atoms)

In the first embodiment, SIBS layer 11a contains a polymer obtained by polymerization of a monomer unit having 4 carbon atoms. The polymer contains a low molecular weight component, which can improve tackiness and vulcanization adhesive strength of the SIBS layer with an adjacent polymer sheet or rubber layer without degrading air permeation resistance originating in the SIBS. Therefore, using SIBS layer 11a containing that polymer for an inner liner part of a tire can improve adhesive strength with an adjacent rubber layer constituting a carcass or insulation, and avoid the air-in phenomenon between the inner liner layer and the carcass or between the inner liner layer and the insulation.

The number-average molecular weight of the polymer obtained by polymerization of a monomer unit having 4 carbon atoms obtained by a GPC measurement is preferably more than or equal to 300 and less than or equal to 3,000, and more preferably, more than or equal to 500 and less than or equal to 2,500. The weight-average molecular weight of that polymer obtained by a GPC measurement is preferably more than or equal to 700 and less than or equal to 100,000, and more preferably, more than or equal to 1,000 and less than or equal to 80,000. The viscosity-average molecular weight of that polymer obtained by a FCC measurement is preferably more than or equal to 20,000 and less than or equal to 70,000, and more preferably, more than or equal to 30,000 and less than or equal to 60,000.

The polymer obtained by polymerization of a monomer unit having 4 carbon atoms includes polybutene, polyisobutylene, and so forth.

Polybutene is a copolymer having a molecular structure of long chain hydrocarbon mainly composed of isobutene as a monomer unit, with normal butene being further used, and obtained by causing them to react with each other. Hydrogenated polybutene may also be used as polybutene.

Polyisobutylene is a copolymer having a molecular structure of long chain hydrocarbon composed of isobutene as a monomer unit and obtained by polymerization thereof.

(SIBS Layer)

In the first embodiment, SIBS layer 11a contains more than or equal to 0.5% by mass and less than or equal to 40% by mass of a polymer obtained by polymerization of a monomer unit having 4 carbon atoms. When the content of the polymer obtained by polymerization of a monomer unit having 4 carbon atoms is less than 0.5% by mass, vulcanization adhesive strength with the carcass or the insulation may be reduced, and when the content of the polymer is more than 40% by mass, air permeation resistance may be reduced, further reducing viscosity, which may cause extrusion moldability to deteriorate. Therefore, both the cases are not preferred. The content of the polymer is preferably more than or equal to 5% by mass and less than or equal to 20% by mass. The content of the SIBS in SIBS layer 11a is preferably more than or equal to 60% by mass and less than or equal to 99.5% by mass. When the content of the SIBS is less than 60% by mass, air permeation resistance may be reduced, and when the content of the SIBS is more than 99.5% by mass, vulcanization adhesive strength with the carcass or the insulation may be reduced. Therefore, both the cases are not preferred. The content of the SIBS is more preferably more than or equal to 80% by mass and less than or equal to 95% by mass.

The thickness of SIBS layer 11a is more than or equal to 0.05 and less than or equal to 0.6 mm. When the thickness of SIBS layer 11a is less than 0.05 mm, the SIBS layer may be broken by a pressing pressure during vulcanization of a green tire in which the polymer sheet is used as the inner liner, and thus an air leak phenomenon may occur in the resultant tire. In contrast, when the thickness of SIBS layer 11a is more than 0.6 mm, tire weight increases and fuel efficiency deteriorates. The thickness of SIBS layer 11a is more preferably more than or equal to 0.05 mm and less than or equal to 0.4 mm.

SIBS layer 11a can be obtained by forming the SIBS into a sheet by a conventional method of forming a thermoplastic resin or a thermoplastic elastomer into a sheet, such as extrusion molding or calender molding.

With reference to FIG. 1, when polymer sheet 10a is used as inner liner 9 of pneumatic tire 1, SIBS layer 11a and carcass 6 can be vulcanization-bonded in a vulcanization step of the tire. Therefore, the resultant pneumatic tire 1 can avoid the air-in phenomenon and further present excellent air permeation resistance since inner liner 9 is satisfactorily bonded with a rubber layer of carcass 6.

[Embodiment 2]

Figure 3:
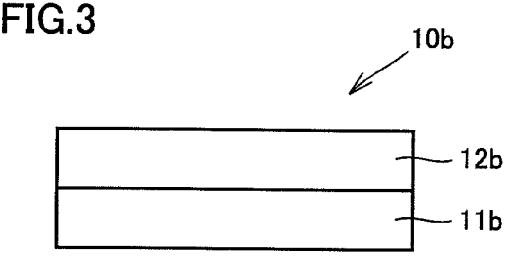

A structure of a polymer sheet for an inner liner of a second embodiment will be described with reference to FIG. 3.

A polymer sheet 10b for an inner liner has an SIBS layer 11b containing the SIBS and an SIS layer 12b containing a styrene-isoprene-styrene triblock copolymer (hereinafter also referred to as SIS). At least one of SIBS layer 11b and SIS layer 12b contains more than or equal to 0.5% by mass and less than or equal to 40% by mass of a polymer obtained by polymerization of a monomer unit having 4 carbon atoms.

The polymer obtained by polymerization of the SIBS and the monomer unit having 4 carbon atoms can be embodied by one similar to that of the first embodiment.

(Styrene-Isoprene-Styrene Triblock Copolymer)

Since an isoprene block of a styrene-isoprene-styrene triblock copolymer is a soft segment, a polymer sheet containing the SIS is easily vulcanization-bonded with a rubber component. Therefore, when the polymer sheet containing the SIS is used as the inner liner, the inner liner is excellent in adhesion with an adjacent rubber constituting a carcass or an insulation, for example, and thus a pneumatic tire that can avoid the air-in phenomenon and present excellent durability can be obtained.

Although there is no particular limitation on the molecular weight of the SIS, the weight-average molecular weight obtained by the GPC measurement is preferably more than or equal to 100,000 and less than or equal to 290,000 in view of rubber elasticity and moldability. When the weight-average molecular weight is less than 100,000, tensile strength may decrease. When the weight-average molecular weight is more than 290,000, extrusion moldability may deteriorate. Therefore, both the cases are not preferred.

The content of a styrene unit in the SIS is preferably more than or equal to 10% by mass and less than or equal to 30% by mass in view of tackiness, adhesion and rubber elasticity.

In the SIS, a molar ratio of an isoprene unit to a styrene unit (isoprene unit/styrene unit) is preferably from 90/10 to 70/30. In the SIS, the polymerization degree of each block is preferably from about 500 to 5,000 for an isoprene block, and preferably from about 50 to 1,500 for a styrene block, in view of the rubber elasticity and handling.

The SIS can be obtained by a conventional polymerization method of a vinyl-based compound and, for example, can be obtained by a living cationic polymerization method.

The SIS layer can be obtained by forming the SIS into a sheet by a conventional method of forming a thermoplastic resin or a thermoplastic elastomer into a sheet, such as extrusion molding or calender molding.

(SIBS Layer, SIS Layer)

In the second embodiment, at least one of SIBS layer 11b and SIS layer 12b contains more than or equal to 0.5% by mass and less than or equal to 40% by mass of the polymer obtained by polymerization of a monomer unit having 4 carbon atoms. Specifically, this applies to the cases in which: (a) SIBS layer 11b contains that polymer and SIS layer 12b does not; (b) SIBS layer 11b does not contain that polymer and SIS layer 12b does; and (c) both of SIBS layer 11b and SIS layer 12b contain that polymer. Among the cases (a) to (c), the case (c) is preferable in terms of high adhesive strength.

When SIBS layer 11b contains the polymer obtained by polymerization of a monomer unit having 4 carbon atoms, the content of each of the SIBS and the polymer can be similar to that in the first embodiment.

When SIS layer 12b contains the polymer obtained by polymerization of a monomer unit having 4 carbon atoms, the content of the polymer is preferably more than or equal to 0.5% by mass and less than or equal to 40% by mass. When the content of the polymer is less than 0.5% by mass, vulcanization adhesive strength with the carcass or the insulation may be reduced, and when the content of the polymer is more than 40% by mass, air permeation resistance may be reduced, further reducing viscosity, which may cause extrusion moldability to deteriorate. Therefore, both the cases are not preferred. The content of the polymer is more preferably more than or equal to 5% by mass and less than or equal to 20% by mass. The content of the SIS in SIS layer 12b is preferably more than or equal to 60% by mass and less than or equal to 99.5% by mass. When the content of the SIS is less than 60% by mass, viscosity may be reduced, which may cause extrusion moldability to deteriorate, and when the content of the SIS is more than 99.5% by mass, vulcanization adhesive strength with the carcass or the insulation may be reduced. Therefore, both the cases are not preferred. The content of the SIS is more preferably more than or equal to 80% by mass and less than or equal to 95% by mass.

The thickness of SIBS layer 11b can be made similar to the counterpart in the first embodiment.

The thickness of SIS layer 12b is more than or equal to 0.01 mm and less than or equal to 0.3 mm. When the thickness of SIS layer 12b is less than 0.01 mm, SIS layer 12b may be broken by a pressing pressure during vulcanization of a green tire in which the polymer sheet is used as the inner liner, and thus the vulcanization adhesive force may decrease. In contrast, when the thickness of SIS layer 12b is more than 0.3 mm, tire weight increases and fuel efficiency deteriorates. The thickness of SIS layer 12b is more preferably more than or equal to 0.05 mm and less than or equal to 0.2 mm.

With reference to FIG. 1, when polymer sheet 10b is used as inner liner 9 of pneumatic tire 1, if a surface in which SIBS layer 11b exists is arranged toward the tire radial innermost side, and a surface in which SIS layer 12b exists is arranged toward a tire radial outer side so as to contact carcass 6, SIS layer 12b and carcass 6 can be vulcanization-bonded in a vulcanization step of the tire. Therefore, the resultant pneumatic tire 1 can avoid the air-in phenomenon and further present excellent air permeation resistance and durability since inner liner 9 is satisfactorily bonded with a rubber layer of carcass 6.

[Embodiment 3]

Figure 4:
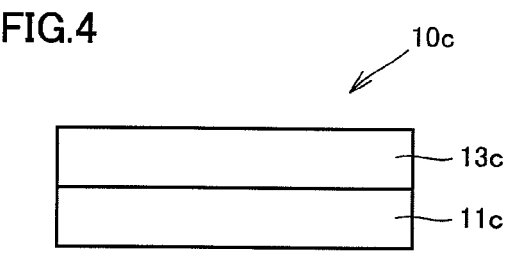

A structure of a polymer sheet for an inner liner of a third embodiment will be described with reference to FIG. 4.

A polymer sheet 10c for an inner liner has an SIBS layer 11c containing an SIBS and an SIB layer 13c containing a styrene-isobutylene diblock copolymer (hereinafter also referred to as SIB). At least one of SIBS layer 11c and SIB layer 13c contains more than or equal to 0.5% by mass and less than or equal to 40% by mass of a polymer obtained by polymerization of a monomer unit having 4 carbon atoms.

The polymer obtained by polymerization of the SIBS and the monomer unit having 4 carbon atoms can be embodied by one similar to that of the first embodiment.

(Styrene-Isobutylene Diblock Copolymer)

Since an isobutylene block of a styrene-isobutylene diblock copolymer is a soft segment, a polymer sheet containing the SIB is easily vulcanization-bonded with a rubber component. Therefore, when the polymer sheet containing the SIB is used as the inner liner, the inner liner is excellent in adhesion with an adjacent rubber constituting a carcass or an insulation, for example, and thus a pneumatic tire that can avoid the air-in phenomenon and present excellent durability can be obtained.

It is preferred to use one having a linear molecular chain as the SIB in view of rubber elasticity and adhesion.

Although there is no particular limitation on the molecular weight of the SIB, the weight-average molecular weight obtained by the GPC measurement is preferably more than or equal to 40,000 and less than or equal to 120,000 in view of rubber elasticity and moldability. When the weight-average molecular weight is less than 40,000, tensile strength may decrease. When the weight-average molecular weight is more than 120,000, extrusion moldability may deteriorate. Therefore, both the cases are not preferred.

The content of a styrene unit in the SIB is preferably more than or equal to 10% by mass and less than or equal to 35% by mass in view of tackiness, adhesion and rubber elasticity.

In the SIB, a molar ratio of an isobutylene unit to a styrene unit (isobutylene unit/styrene unit) is preferably from 90/10 to 65/35. In the SIB, the polymerization degree of each block is preferably from about 300 to 3,000 for an isobutylene block, and preferably from about 10 to 1,500 for a styrene block, in view of rubber elasticity and handling.

The SIB can be obtained by a conventional polymerization method of a vinyl-based compound and, for example, can be obtained by a living cationic polymerization method.

International Publication No. WO 2005/033035 discloses a production method in which methylcyclohexane, n-butyl chloride and cumyl chloride are charged in a stirrer, cooled to −70° C. and reacted for 2 hours, and then the reaction is terminated by adding a large amount of methanol and the reaction product is vacuum-dried at 60° C. to obtain an SIB.

The SIB layer can be obtained by forming the SIB into a sheet by a conventional method of forming a thermoplastic resin or a thermoplastic elastomer into a sheet, such as extrusion molding or calender molding.

(SIBS Layer, SIB Layer)

In the third embodiment, at least one of SIBS layer 11c and SIB layer 13c contains more than or equal to 0.5% by mass and less than or equal to 40% by mass of the polymer obtained by polymerization of a monomer unit having 4 carbon atoms. Specifically, this applies to the cases in which: (a) SIBS layer 11c contains that polymer and SIB layer 13c does not; (b) SIBS layer 11c does not contain that polymer and SIB layer 13c does; and (c) both of SIBS layer 11c and SIB layer 13c contain that polymer. Among the cases (a) to (c), the case (c) is preferable in terms of high adhesive strength.

When SIBS layer 11c contains the polymer obtained by polymerization of a monomer unit having 4 carbon atoms, the content of each of the SIBS and the polymer can be similar to the counterpart in the first embodiment.

When SIB layer 13c contains the polymer obtained by polymerization of a monomer unit having 4 carbon atoms, the content of the polymer is preferably more than or equal to 0.5% by mass and less than or equal to 40% by mass. When the content of the polymer is less than 0.5% by mass, vulcanization adhesive strength with the carcass or the insulation may be reduced, and when the content of the polymer is more than 40% by mass, air permeation resistance may be reduced, further reducing viscosity, which may cause extrusion moldability to deteriorate. Therefore, both the cases are not preferred. The content of the polymer is more preferably more than or equal to 5% by mass and less than or equal to 20% by mass. The SIB content in SIB layer 13c is preferably more than or equal to 60% by mass and less than or equal to 99.5% by mass. When the SIB content is less than 60% by mass, viscosity may be reduced, which may cause extrusion moldability to deteriorate, and when the SIB content is more than 99.5% by mass, vulcanization adhesive strength with the carcass or the insulation may be reduced. Therefore, both the cases are not preferred. The SIB content is more preferably more than or equal to 80% by mass and less than or equal to 95% by mass.

The thickness of SIBS layer 11c can be made similar to that of SIBS layer 11a of the first embodiment.

The thickness of SIB layer 13c is more than or equal to 0.01 mm and less than or equal to 0.3 mm. When the thickness of SIB layer 13c is less than 0.01 mm, SIB layer 13c may be broken by a pressing pressure during vulcanization of a green tire in which the polymer sheet is used as the inner liner, and thus the vulcanization adhesive force may decrease. In contrast, when the thickness of SIB layer 13c is more than 0.3 mm, tire weight increases and fuel efficiency deteriorates. The thickness of SIB layer 13c is more preferably more than or equal to 0.05 mm and less than or equal to 0.2 mm.

With reference to FIG. 1, when polymer sheet 10c is used as inner liner 9 of pneumatic tire 1, if a surface in which SIBS layer 11c exists is arranged toward the tire radial innermost side, and a surface in which SIB layer 13c exists is arranged toward a tire radial outer side so as to contact carcass 6, SIB layer 13c and carcass 6 can be vulcanization-bonded in a vulcanization step of the tire. Therefore, the resultant pneumatic tire 1 can avoid the air-in phenomenon and further present excellent air permeation resistance and durability since inner liner 9 is satisfactorily bonded with a rubber layer of carcass 6.

[Embodiment 4]

Figure 5:
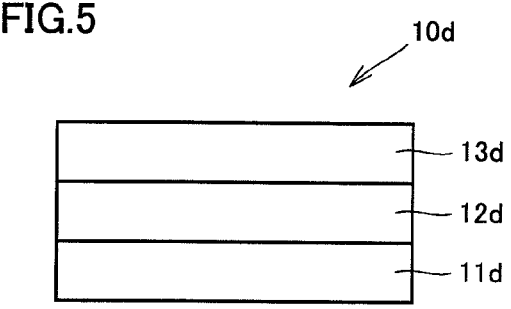

A structure of a polymer sheet for an inner liner of a fourth embodiment will be described with reference to FIG. 5.

A polymer sheet 10d for an inner liner has an SIBS layer 11d containing an SIBS, an SIS layer 12d containing an SIS, and an SIB layer 13d containing an SIB. SIBS layer 11d, SIS layer 12d, and SIB layer 13d are stacked in the order presented. At least one of SIBS layer 11d, SIS layer 12d, and SIB layer 13d contains more than or equal to 0.5% by mass and less than or equal to 40% by mass of a polymer obtained by polymerization of a monomer unit having 4 carbon atoms.

The polymer obtained by polymerization of the SIBS and the monomer unit having 4 carbon atoms can be embodied by one similar to that of the first embodiment. The SIS can be embodied by one similar to that of the second embodiment. The SIB can be embodied by one similar to that of the third embodiment.

(SIBS Layer, SIS Layer, SIB Layer)

In the fourth embodiment, at least one of SIBS layer 11d, SIS layer 12d, and SIB layer 13d contains more than or equal to 0.5% by mass and less than or equal to 40% by mass of the polymer obtained by polymerization of a monomer unit having 4 carbon atoms. Specifically, this applies to the cases in which: (a) only SIBS layer 11d contains that polymer; (b) only SIS layer 12d contains that polymer; (c) only SIB layer 13d contains that polymer; (d) SIBS layer 11d and SIS layer 12d contain that polymer, and SIB layer 13d does not; (e) SIBS layer 11d and SIB layer 13d contain that polymer, and SIS layer 12d does not; (f) SIS layer 12d and SIB layer 13d contain that polymer, and SIBS layer 11d does not; and (g) all of SIBS layer 11d, SIS layer 12d, and SIB layer 13d contain that polymer. Among the cases (a) to (g), the case (d) is preferable in terms of high adhesive strength and low cost.

When SIBS layer 11d contains the polymer obtained by polymerization of a monomer unit having 4 carbon atoms, the content of each of the SIBS and the polymer can be made similar to the counterpart in the first embodiment.

When SIS layer 12d contains the polymer obtained by polymerization of a monomer unit having 4 carbon atoms, the content of each of the SIS and the polymer can be made similar to the counterpart in the second embodiment.

When SIB layer 13d contains the polymer obtained by polymerization of a monomer unit having 4 carbon atoms, the content of each of the SIB and the polymer can be made similar to the counterpart in the third embodiment.

The thickness of SIBS layer 11d can be made similar to that of SIBS layer 11a of the first embodiment.

SIS layer 12d and SIB layer 13d have a total thickness more than or equal to 0.01 mm and less than or equal to 0.3 mm. When the total thickness of SIS layer 12d and SIB layer 13d is less than 0.01 mm, SIS layer 12d and SIB layer 13d may be broken by a pressing pressure during vulcanization of a green tire in which the polymer sheet is used as the inner liner, and thus the vulcanization adhesive force may decrease. In contrast, when the thickness of SIS layer 12d and SIB layer 13d is more than 0.3 mm, tire weight increases and fuel efficiency deteriorates. The total thickness of SIS layer 12d and SIB layer 13d is more preferably more than or equal to 0.05 mm and less than or equal to 0.2 mm.

With reference to FIG. 1, when polymer sheet 10d is used as inner liner 9 of pneumatic tire 1, if a surface in which SIBS layer 11d exists is arranged toward the tire radial innermost side, and a surface in which SIB layer 13d exists is arranged toward a tire radial outer side so as to contact carcass 6, SIB layer 13d and carcass 6 can be vulcanization-bonded in a vulcanization step of the tire. Therefore, the resultant pneumatic tire 1 can avoid the air-in phenomenon and further present excellent air permeation resistance and durability since inner liner 9 is satisfactorily bonded with a rubber layer of carcass 6.

[Embodiment 5]

Figure 6:
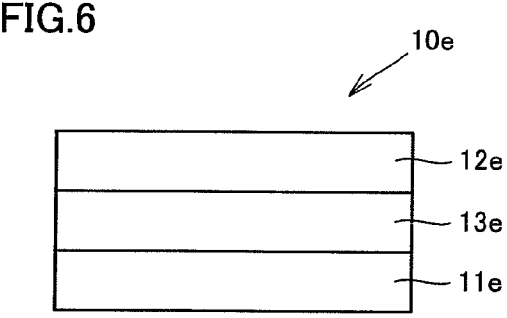

A structure of a polymer sheet for an inner liner of a fifth embodiment will be described with reference to FIG. 6.

A polymer sheet 10e for an inner liner has an SIBS layer 11e containing an SIBS, an SIB layer 13e containing an SIB, and an SIS layer 12e containing an SIS. SIBS layer 11e, SIB layer 13e, and SIS layer 12e are stacked in the order presented. At least one of SIBS layer 11e, SIS layer 12e, and SIB layer 13e contains more than or equal to 0.5% by mass and less than or equal to 40% by mass of a polymer obtained by polymerization of a monomer unit having 4 carbon atoms.

Polymer sheet 10e for an inner liner of the fifth embodiment can be configured similarly to the counterpart of the fourth embodiment except that the SIS layer and the SIB layer are stacked in the different order.

<Method for Producing Polymer Sheet for Inner Liner>

A polymer sheet for an inner liner of one embodiment of the present invention can be obtained by coextrusion of pellets of an SIBS, an SIS and an SIB with a T-die extruder. The SIBS layer, the SIS layer, and the SIB layer can be obtained by lamination extrusion such as laminate extrusion or coextrusion of the SIBS layer, the SIS layer, and the SIB layer in the order described in, for example, any one of Embodiments 2 to 5.

<Method for Producing Pneumatic Tire>

In one embodiment of the present invention, a method for producing a pneumatic tire preferably includes the following steps. A green tire with a polymer sheet for an inner liner used as the inner liner is prepared. The green tire is mounted in a mold for vulcanization with pressurization by a bladder to obtain a vulcanized tire. The vulcanized tire is cooled at 50 to 120° C. for 10 to 300 seconds.

(Step of Preparing Green Tire)

The polymer sheet for an inner liner is disposed on an inner liner part of a green tire. When the multilayer polymer sheet for an inner liner is disposed on the green tire, the SIB layer or the SIS layer of the polymer sheet is arranged toward the tire radial outer side so as to contact carcass 6. With such an arrangement, the SIB layer or the SIS layer and carcass 6 can be vulcanization-bonded in a tire vulcanization step. Therefore, the resultant pneumatic tire 1 can have excellent air permeation resistance and durability since inner liner 9 is satisfactorily bonded with the rubber layer of carcass 6.

Also when an insulation is provided between inner liner 9 and carcass 6, it is possible to increase the adhesive strength between inner liner 9 and the insulation by arranging the SIB layer or the SIS layer toward the tire radial outer side so as to contact the insulation.

<Step of Obtaining Vulcanized Tire>

Next, the resultant green tire is mounted in a mold and vulcanized while being pressurized by a bladder.

The mold is made of a metal. The bladder is made of a rubber. The bladder is held in the mold.

In the step of obtaining a vulcanized tire, the green tire is placed in an opened mold. During the placement, the bladder is shrunk. Upon the placement, the bladder is located at the inner side of the green tire. The bladder is filled with a gas to expand. The green tire is deformed by this expansion. This deformation is called shaping. Next, the mold is tightened and an internal pressure of the bladder is increased. The green tire is interposed between a cavity surface of the mold and the outside surface of the bladder to be pressurized. The green tire is heated by heat conduction from the mold and the bladder. The rubber composition of the green tire flows due to application of pressure and heat. Air inside the mold is moved by the flow to be discharged from the mold. The rubber is heated to cause the vulcanization reaction, and thus a vulcanized tire is obtained.

Vulcanization is preferably performed at 150 to 180° C. for 3 to 50 minutes, for example.

<Step of Cooling Vulcanized Tire>

Next, the resultant vulcanized tire is preferably cooled at 50 to 120° C. for 10 to 300 seconds.

In the pneumatic tire, the inner liner is implemented by a polymer sheet for an inner liner of the present invention. The SIBS, the SIS and the SIB constituting the polymer sheet, which are thermoplastic elastomers, are softened in the mold when heated to 150 to 180° C., for example, in the step of obtaining the vulcanized tire. The softened thermoplastic elastomers have higher reactivity than in the solid state, and are thus fused with an adjacent member. That is, the inner liner in contact with the outside surface of the expanded bladder is softened by heating to be fused with the bladder. When an attempt is made to remove the vulcanized tire from the mold in a state where the inner liner is fused with the outside surface of the bladder, the inner liner peels off the insulation or the carcass adjacent thereto, causing an air-in phenomenon. Further, the tire may be deformed in shape.

Therefore, by quenching the resultant vulcanized tire immediately at 120° C. or lower for 10 or more seconds, the thermoplastic elastomer used for the inner liner can be solidified. When the thermoplastic elastomer is solidified, fusing of the inner liner with the bladder is eliminated, and thus the releasability when removing the vulcanized tire from the mold is improved.

The cooling temperature is preferably from 50 to 120° C. When the cooling temperature is lower than 50° C., it is necessary to prepare a particular cooling medium, which may degrade productivity. When the cooling temperature is higher than 120° C., the thermoplastic elastomer may not be sufficiently cooled, which causes the inner liner to be still fused with the bladder upon opening of the mold, giving rise to an air-in phenomenon. The cooling temperature is more preferably from 70 to 100° C.

The cooling time is preferably from 10 to 300 seconds. When the cooling time is less than 10 seconds, the thermoplastic elastomer may not be sufficiently cooled, which causes the inner liner to be still fused with the bladder upon opening of the mold, giving rise to an air-in phenomenon. When the cooling time is more than 300 seconds, productivity is degraded. The cooling time is more preferably from 30 to 180 seconds.

The step of cooling the vulcanized tire is preferably performed by cooling inside the bladder. Since a cavity exists inside the bladder, it is possible to introduce a cooling medium controlled to the cooling temperature into the bladder after completion of the vulcanization step.

It is also possible to carry out the step of cooling the vulcanized tire by cooling inside the bladder and also disposing a cooling structure in the mold.

It is preferred to use, as a cooling medium, at least one selected from the group consisting of air, steam, water and oil. Of these, water having excellent cooling efficiency is preferably used.

<Examples 1 to 32, Comparative Examples 1 to 41>

The present invention will now be described specifically based on examples, but the present invention is not limited only thereto.

(Preparation of SIB)

In a 2 L reaction vessel equipped with a stirrer, 589 mL of methylcyclohexane (dried over molecular sieves), 613 mL of n-butyl chloride (dried over molecular sieves) and 0.550 g of cumyl chloride were charged. After cooling the reaction vessel to −70° C., 0.35 mL of a-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating a polymer, and the resultant polymer was dried at 60° C. for 24 hours to obtain a styrene-isobutylene diblock copolymer.

(Production of Polymer Sheet)

Examples 1 to 32, Comparative Examples 2 to 12, 14 to 27, 29 to 41

After mixing respective ingredients in accordance with formulations shown in Tables 2 to 6, a twin-screw extruder (screw diameter: φ50 mm; L/D: 30; cylinder temperature: 220° C.) was used to obtain a pellet. The obtained pellet was coextruded by a T-die extruder (screw diameter: φ80 mm; L/D: 50; die gap width: 500 mm; cylinder temperature: 220° C.) to produce polymer sheets each having a first layer, a second layer and/or a third layer as shown in Tables 2 to 6. When a polymer sheet is composed of three layers, the first layer, the second layer and the third layer were laminated in the order presented.

Comparative Examples 1, 13, 28

The respective ingredients were mixed in accordance with formulations shown in Tables 3 and 6 by a Banbury mixer and then formed into a sheet by a calender roll to obtain a polymer sheet having a thickness of 0.5 mm.

(Production of Pneumatic Tire)

The resultant polymer sheet was used for the inner liner part of a tire to prepare a green tire. It is to be noted that, when the polymer sheet was composed of a plurality of layers, the polymer sheet was arranged so that the first layer was located at the tire radial innermost side and the second or third layer contacted the carcass layer of the green tire. The green tire was subjected to press molding in a mold at 170° C. for 20 minutes to obtain a vulcanized tire of 195/65R15 size. After cooling the vulcanized tire at 100° C. for 3 minutes, the vulcanized tire was removed from the mold to obtain a pneumatic tire.

With respect to the polymer sheet and the pneumatic tire, the following evaluations were performed.

(Vulcanization Adhesive Strength of First Layer)

The first layer and the carcass were bonded together, and were heated at 170° C. for 20 minutes to obtain a sample for measuring vulcanization adhesive strength. Peel force was measured in a tensile peel test as vulcanization adhesive strength. The obtained value was expressed as an index by the following equation for vulcanization adhesive strength of the first layer in each of Examples 1 to 32 and Comparative Examples 2 to 41 using Comparative Example 1 as a reference value (100). It shows that the greater the value, the greater the vulcanization adhesive strength, which is preferable.

(vulcanization adhesive strength index)=(vulcanization adhesive strength of each of Examples 1 to 32 and Comparative Examples 2 to 41)/(vulcanization adhesive strength of Comparative Example 1)×100

(Presence or Absence of Air-In Portions)

The inside of the tire after vulcanization was examined, and evaluated on the following criteria.

A: In appearance, per tire, the number of air-in portions with a diameter of 5 mm or less and the number of air-in portions with a diameter more than 5 mm were both 0.

B: In appearance, per tire, the number of air-in portions with a diameter of 5 mm or less was one to three, and the number of air-in portions with a diameter more than 5 mm was 0.

C: In appearance, per tire, the number of air-in portions with a diameter of 5 mm or less was four or more, and the number of air-in portions with a diameter more than 5 mm was one or more.

(Flex Crack Growth)

In a driving test of tire durability, it was evaluated whether the inner liner was broken or peeled off. The produced pneumatic tire of 195/65R15 size was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. The resultant value was expressed as an index by the following equation for flex crack growth in each of Examples 1 to 32 and Comparative Examples 2 to 41 using Comparative Example 1 as a reference value (100). It shows that the greater the value, the more excellent the flex crack growth resistance.

(flex crack growth index)=(the number of cracked/peeled portions of Comparative Example 1)/(the number of cracked/peeled portions of each of Examples 1 to 32 and Comparative Examples 2 to 41)×100

(Rolling Resistance)

Using a rolling resistance tester manufactured by KOBE STEEL, LTD., the produced pneumatic tire of 195/65R15 size was mounted on a JIS standard rim 15×6JJ, and rolling resistance was measured while driving the tire at room temperatures (38° C.) under the conditions of a load of 3.4 kN, an air pressure of 230 kPa, and a speed of 80 km/hour. The resultant value was expressed as an index by the following equation for rolling resistance in each of Examples 1 to 32 and Comparative Examples 2 to 41 using Comparative Example 1 as a reference value (100). It shows that the greater the value, the smaller the rolling resistance, which is preferable.

(rolling resistance index)=(rolling resistance of Comparative Example 1)/(rolling resistance of each of Examples 1 to 32 and Comparative Examples 2 to 41)×100

(Static Air Pressure Drop)

The produced tire of 195/65R15 size was mounted on a JIS standard rim 15×6JJ and an initial air pressure of 300 kPa was applied. The tire was left at room temperatures for 90 days, following which an air pressure drop rate was calculated.

(Overall Judgment)

Criteria for overall judgment are as shown in Table 1.

TABLE 1

| Overall judgment | Judgment criteria | (a) Adhesive strength of first layer | (b) Presence or absence of air-in portions | (c) Flex crack growth index | (d) Rolling resistance Index | (e) Static air pressure drop rate (%/month) |
|---|---|---|---|---|---|---|
| A | All of (a) to (e) satisfy conditions on the right. | 100 or more | A or B | 100 or more | 100 or more | 2.9 or less |
| B | Any one of (a) to (e) satisfies a corresponding condition on the right. | less than 100 | C | less than 100 | less than 100 | more than 2.9 |

(Evaluation Results)
The test results are shown in Tables 2 to 6.

TABLE 2

|  |  |  |  | Examples | | | | | | | | |
|---|---|---|---|---|---|---|---|---|---|---|---|---|
|  |  |  |  | 1 | 2 | 3 | 4 | 5 | 6 | 7 | 8 | 9 |
| Polymer sheet composition | First layer | Formulation (% by mass)(*9) | IIR/NR(*1) | — | — | — | — | — | — | — | — | — |
|  |  |  | Filler(*2) | — | — | — | — | — | — | — | — | — |
|  |  |  | SIBS(*3) | 99.5 | 99.5 | 99.5 | 99.5 | 100 | 100 | 100 | 99.5 | 60 |
|  |  |  | Polybutene(*4) | 0.5 | 0.5 | 0.5 | 0.5 | — | — | — | 0.5 | 40 |
|  |  |  | Naphthenic oil(*5) | — | — | — | — | — | — | — | — | — |
|  |  | Layer thickness (mm) |  | 0.3 | 0.2 | 0.2 | 0.2 | 0.2 | 0.2 | 0.2 | 0.2 | 0.3 |
|  | Second layer | Formulation (% by mass) | SIS(*6) | — | 100 | — | 100 | 99.5 | — | 99.5 | 99.5 | — |
|  |  |  | SIB(*7) | — | — | 100 | — | — | 99.5 | — | — | — |
|  |  |  | Polybutene(*4) | — | — | — | — | 0.5 | 0.5 | 0.5 | 0.5 | — |
|  |  |  | Naphthenic oil(*5) | — | — | — | — | — | — | — | — | — |
|  |  | Layer thickness (mm) |  | — | — | — | — | — | — | 0.1 | 0.05 | — |
|  | Third layer | Formulation (% by mass) | SIS(*6) | — | — | — | — | — | — | — | — | — |
|  |  |  | SIB(*7) | — | — | — | 100 | — | — | — | 99.5 | — |
|  |  |  | Polybutene(*4) | — | — | — | — | — | — | — | 0.5 | — |
|  |  |  | Naphthenic oil(*5) | — | — | — | — | — | — | — | — | — |
|  |  | Layer thickness (mm) |  | — | — | — | — | — | — | — | 0.05 | — |
| Performance evaluation | Polymer sheet test | Vulcanization adhesive strength index |  | 101 | 111 | 111 | 111 | 105 | 105 | 105 | 115 | 150 |
|  | Tire test | Presence or absence of air-in portions |  | B | B | B | B | B | B | B | B | B |
|  |  | Flex crack growth index |  | 115 | 112 | 112 | 112 | 108 | 108 | 108 | 112 | 130 |
|  |  | Rolling resistance index |  | 105 | 105 | 105 | 105 | 104 | 104 | 104 | 105 | 101 |
|  |  | Static air pressure drop rate (%/month) |  | 1.7 | 1.9 | 1.9 | 1.9 | 1.9 | 1.9 | 1.9 | 1.9 | 2.5 |
| Overall judgment |  |  |  | A | A | A | A | A | A | A | A | A |

|  |  |  |  | Examples | | | | | | |
|---|---|---|---|---|---|---|---|---|---|---|
|  |  |  |  | 10 | 11 | 12 | 13 | 14 | 15 | 16 |
| Polymer sheet composition | First layer | Formulation (% by mass)(*9) | IIR/NR(*1) | — | — | — | — | — | — | — |
|  |  |  | Filler(*2) | — | — | — | — | — | — | — |
|  |  |  | SIBS(*3) | 60 | 60 | 60 | 100 | 100 | 100 | 60 |
|  |  |  | Polybutene(*4) | 40 | 40 | 40 | — | — | — | 40 |
|  |  |  | Naphthenic oil(*5) | — | — | — | — | — | — | — |
|  |  | Layer thickness (mm) |  | 0.2 | 0.2 | 0.2 | 0.2 | 0.2 | 0.2 | 0.2 |
|  | Second layer | Formulation (% by mass) | SIS(*6) | 100 | — | 100 | 60 | — | 60 | 60 |
|  |  |  | SIB(*7) | — | 100 | — | — | 60 | — | — |
|  |  |  | Polybutene(*4) | — | — | — | 40 | 40 | 40 | 40 |
|  |  |  | Naphthenic oil(*5) | — | — | — | — | — | — | — |
|  |  | Layer thickness (mm) |  | 0.1 | 0.1 | 0.05 | 0.1 | 0.1 | 0.05 | 0.05 |
|  | Third layer | Formulation (% by mass) | SIS(*6) | — | — | — | — | — | — | — |
|  |  |  | SIB(*7) | — | — | 100 | — | — | 60 | 60 |
|  |  |  | Polybutene(*4) | — | — | — | — | — | 40 | 40 |
|  |  |  | Naphthenic oil(*5) | — | — | — | — | — | — | — |
|  |  | Layer thickness (mm) |  | — | — | 0.05 | — | — | 0.05 | 0.05 |
| Performance evaluation | Polymer sheet test | Vulcanization adhesive strength index |  | 165 | 165 | 165 | 157 | 157 | 157 | 168 |
|  | Tire test | Presence or absence of air-in portions |  | B | B | B | B | B | B | B |
|  |  | Flex crack growth index |  | 127 | 127 | 127 | 108 | 108 | 108 | 127 |
|  |  | Rolling resistance index |  | 101 | 101 | 101 | 104 | 104 | 104 | 101 |
|  |  | Static air pressure drop rate (%/month) |  | 2.7 | 2.7 | 2.7 | 2.7 | 2.7 | 2.7 | 2.7 |
| Overall judgment |  |  |  | A | A | A | A | A | A | A |

TABLE 3

|  |  |  |  | Comparative Examples | | | | | | | |
|---|---|---|---|---|---|---|---|---|---|---|---|
|  |  |  |  | 1 | 2 | 3 | 4 | 5 | 6 | 7 | 8 |
| Polymer sheet composition | First layer | Formulation (% by mass)(*9) | IIR/NR(*1) | 95 | — | — | — | — | — | — | — |
|  |  |  | Filler(*2) | 60 | — | — | — | — | — | — | — |
|  |  |  | SIBS(*3) | — | 100 | 100 | 100 | 100 | 95 | 95 | 95 |
|  |  |  | Polybutene(*4) | — | — | — | — | — | — | — | — |
|  |  |  | Naphthenic oil(*5) | 5 | — | — | — | — | 5 | 5 | 5 |
|  |  | Layer thickness (mm) |  | 0.5 | 0.3 | 0.2 | 0.2 | 0.2 | 0.3 | 0.2 | 0.2 |

TABLE 3-continued

|  |  |  |  |  |  |  |  |  |  |  |
|---|---|---|---|---|---|---|---|---|---|---|
|  | Second layer | Formulation (% by mass) | SIS(*6) | — | — | 100 | — | 100 | — | 100 | — |
|  |  |  | SIB(*7) | — | — | — | 100 | — | — | — | 100 |
|  |  |  | Polybutene(*4) | — | — | — | — | — | — | — | — |
|  |  |  | Naphthenic oil(*5) | — | — | — | — | — | — | — | — |
|  |  | Layer thickness (mm) |  | — | — | — | — | — | — | — | — |
|  | Third layer | Formulation (% by mass) | SIS(*6) | — | — | — | — | — | — | — | — |
|  |  |  | SIB(*7) | — | — | — | — | 100 | — | — | — |
|  |  |  | Polybutene(*4) | — | — | — | — | — | — | — | — |
|  |  |  | Naphthenic oil(*5) | — | — | — | — | — | — | — | — |
|  |  | Layer thickness (mm) |  | — | — | — | — | 0.05 | — | — | — |
| Performance evaluation | Polymer sheet test | Vulcanization adhesive strength index |  | 100 | 10 | 50 | 50 | 50 | 7 | 35 | 35 |
|  | Tire test | Presence or absence of air-in portions |  | B | C | C | C | C | C | C | C |
|  |  | Flex crack growth index |  | 100 | 110 | 108 | 108 | 108 | 113 | 110 | 110 |
|  |  | Rolling resistance index |  | 100 | 104 | 104 | 104 | 104 | 101 | 101 | 101 |
|  |  | Static air pressure drop rate (%/month) |  | 4.0 | 1.7 | 1.9 | 1.9 | 1.9 | 1.9 | 2.1 | 2.1 |
| Overall judgment |  |  |  | B | B | B | B | B | B | B | B |

|  |  |  |  | Comparative Examples |  |  |  |  |  |  |  |
|---|---|---|---|---|---|---|---|---|---|---|---|
|  |  |  |  | 9 | 10 | 11 | 12 | 13 | 14 | 15 | 16 |
| Polymer sheet composition | First layer | Formulation (% by mass)(*9) | IIR/NR(*1) | — | — | — | — | 99.6 | — | — | — |
|  |  |  | Filler(*2) | — | — | — | — | 60 | — | — | — |
|  |  |  | SIBS(*3) | 95 | 100 | 100 | 100 | — | 99.6 | 99.6 | 99.6 |
|  |  |  | Polybutene(*4) | — | — | — | — | 0.4 | 0.4 | 0.4 | 0.4 |
|  |  |  | Naphthenic oil(*5) | 5 | — | — | — | — | — | — | — |
|  |  | Layer thickness (mm) |  | 0.2 | 0.2 | 0.2 | 0.2 | 0.5 | 0.3 | 0.2 | 0.2 |
|  | Second layer | Formulation (% by mass) | SIS(*6) | 100 | 95 | — | 95 | — | — | 100 | — |
|  |  |  | SIB(*7) | — | — | 95 | — | — | — | — | 100 |
|  |  |  | Polybutene(*4) | — | — | — | — | — | — | — | — |
|  |  |  | Naphthenic oil(*5) | — | 5 | 5 | 5 | — | — | — | — |
|  |  | Layer thickness (mm) |  | — | — | 0.1 | 0.05 | — | — | 0.1 | 0.1 |
|  | Third layer | Formulation (% by mass) | SIS(*6) | — | — | — | — | — | — | — | — |
|  |  |  | SIB(*7) | 100 | — | — | 95 | — | — | — | — |
|  |  |  | Polybutene(*4) | — | — | — | — | — | — | — | — |
|  |  |  | Naphthenic oil(*5) | — | — | — | 5 | — | — | — | — |
|  |  | Layer thickness (mm) |  | — | — | — | 0.05 | — | — | — | — |
| Performance evaluation | Polymer sheet test | Vulcanization adhesive strength index |  | 35 | 35 | 35 | 35 | 90 | 80 | 95 | 95 |
|  | Tire test | Presence or absence of air-in portions |  | C | C | C | C | C | C | C | C |
|  |  | Flex crack growth index |  | 110 | 108 | 108 | 108 | 80 | 113 | 110 | 110 |
|  |  | Rolling resistance index |  | 101 | 104 | 104 | 104 | 98 | 104 | 104 | 104 |
|  |  | Static air pressure drop rate (%/month) |  | 2.1 | 1.9 | 1.9 | 1.9 | 4.0 | 1.7 | 1.9 | 1.9 |
| Overall judgment |  |  |  | B | B | B | B | B | B | B | B |

TABLE 4

|  |  |  |  | Comparative Examples |  |  |  |  |  |  |  |  |  |  |
|---|---|---|---|---|---|---|---|---|---|---|---|---|---|---|
|  |  |  |  | 17 | 18 | 19 | 20 | 21 | 22 | 23 | 24 | 25 | 26 | 27 |
| Polymer sheet composition | First layer | Formulation (% by mass)(*9) | IIR/NR(*1) | — | — | — | — | — | — | — | — | — | — | — |
|  |  |  | Filler(*2) | — | — | — | — | — | — | — | — | — | — | — |
|  |  |  | SIBS(*3) | 99.6 | 100 | 100 | 100 | 99.6 | 55 | 55 | 55 | 55 | 55 | 60 |
|  |  |  | Polybutene(*4) | 0.4 | — | — | — | 0.4 | 45 | 45 | 45 | 45 | 45 | — |
|  |  |  | Naphthenic oil(*5) | — | — | — | — | — | — | — | — | — | — | 40 |
|  |  | Layer thickness (mm) |  | 0.2 | 0.2 | 0.2 | 0.2 | 0.2 | 0.3 | 0.2 | 0.2 | 0.2 | 0.2 | 0.2 |
|  | Second layer | Formulation (% by mass) | SIS(*6) | 100 | 99.6 | — | 99.6 | 99.6 | — | 100 | — | 100 | 55 | 60 |
|  |  |  | SIB(*7) | — | — | 99.6 | — | — | — | — | 100 | — | — | — |
|  |  |  | Polybutene(*4) | — | 0.4 | 0.4 | 0.4 | 0.4 | — | — | — | — | 45 | — |
|  |  |  | Naphthenic oil(*5) | — | — | — | — | — | — | — | — | — | — | 40 |
|  |  | Layer thickness (mm) |  | 0.05 | 0.1 | 0.1 | 0.05 | 0.05 | — | 0.1 | 0.1 | 0.05 | 0.05 | 0.05 |
|  | Third layer | Formulation (% by mass) | SIS(*6) | — | — | — | — | — | — | — | — | — | — | — |
|  |  |  | SIB(*7) | 100 | — | — | 99.6 | 99.6 | — | — | — | 100 | 55 | 60 |
|  |  |  | Polybutene(*4) | — | — | — | 0.4 | 0.4 | — | — | — | — | 45 | — |
|  |  |  | Naphthenic oil(*5) | — | — | — | — | — | — | — | — | — | — | 40 |
|  |  | Layer thickness (mm) |  | 0.05 | — | — | 0.05 | 0.05 | — | — | — | 0.05 | 0.05 | 0.05 |
| Performance evaluation | Polymer sheet test | Vulcanization adhesive strength index |  | 95 | 85 | 85 | 85 | 97 | 155 | 169 | 169 | 169 | 172 | 35 |
|  | Tire test | Presence or absence of air-in portions |  | C | C | C | C | C | B | B | B | B | B | C |

TABLE 4-continued

|  |  | Comparative Examples | | | | | | | | | | |
|---|---|---|---|---|---|---|---|---|---|---|---|
|  |  | 17 | 18 | 19 | 20 | 21 | 22 | 23 | 24 | 25 | 26 | 27 |
|  | Flex crack growth index | 110 | 108 | 108 | 108 | 110 | 155 | 150 | 150 | 150 | 150 | 115 |
|  | Rolling resistance index | 104 | 104 | 104 | 104 | 104 | 98 | 98 | 98 | 98 | 98 | 99 |
|  | Static air pressure drop rate (%/month) | 1.9 | 1.9 | 1.9 | 1.9 | 1.9 | 3.0 | 3.3 | 3.3 | 3.3 | 3.3 | 4.5 |
| Overall judgment |  | B | B | B | B | B | B | B | B | B | B | B |

TABLE 5

|  |  |  |  | Examples | | | | | | | |
|---|---|---|---|---|---|---|---|---|---|---|---|
|  |  |  |  | 17 | 18 | 19 | 20 | 21 | 22 | 23 | 24 |
| Polymer sheet composition | First layer | Formulation (% by mass)(*9) | IIR/NR(*1) | — | — | — | — | — | — | — | — |
|  |  |  | Filler(*2) | — | — | — | — | — | — | — | — |
|  |  |  | SIBS(*3) | 99.5 | 99.5 | 99.5 | 99.5 | 100 | 100 | 100 | 99.5 |
|  |  |  | Polyisobutylene(*8) | 0.5 | 0.5 | 0.5 | 0.5 | — | — | — | 0.5 |
|  |  |  | Naphthenic oil(*5) | — | — | — | — | — | — | — | — |
|  |  | Layer thickness (mm) |  | 0.3 | 0.2 | 0.2 | 0.2 | 0.2 | 0.2 | 0.2 | 0.2 |
|  | Second layer | Formulation (% by mass) | SIS(*6) | — | 100 | — | 100 | 99.5 | — | 99.5 | 99.5 |
|  |  |  | SIB(*7) | — | — | 100 | — | — | 99.5 | — | — |
|  |  |  | Polyisobutylene(*8) | — | — | — | — | 0.5 | 0.5 | 0.5 | 0.5 |
|  |  |  | Naphthenic oil(*5) | — | — | — | — | — | — | — | — |
|  |  | Layer thickness (mm) |  | — | 0.1 | 0.1 | 0.05 | 0.1 | 0.1 | 0.05 | 0.05 |
|  | Third layer | Formulation (% by mass) | SIS(*6) | — | — | — | — | — | — | — | — |
|  |  |  | SIB(*7) | — | — | — | 100 | — | — | 99.5 | 99.5 |
|  |  |  | Polyisobutylene(*8) | — | — | — | — | — | — | 0.5 | 0.5 |
|  |  |  | Naphthenic oil(*5) | — | — | — | — | — | — | — | — |
|  |  | Layer thickness (mm) |  | — | — | — | 0.05 | — | — | 0.05 | 0.05 |
| Performance evaluation | Polymer sheet test | Vulcanization adhesive strength index |  | 103 | 113 | 113 | 113 | 107 | 107 | 107 | 107 |
|  | Tire test | Presence or absence of air-in portions |  | B | B | B | B | B | B | B | B |
|  |  | Flex crack growth index |  | 117 | 115 | 115 | 115 | 110 | 110 | 110 | 115 |
|  |  | Rolling resistance index |  | 106 | 106 | 106 | 106 | 105 | 105 | 105 | 106 |
|  |  | Static air pressure drop rate (%/month) |  | 1.6 | 1.8 | 1.8 | 1.8 | 1.8 | 1.8 | 1.8 | 1.8 |
| Overall judgment |  |  |  | A | A | A | A | A | A | A | A |

|  |  |  |  | Examples | | | | | | | |
|---|---|---|---|---|---|---|---|---|---|---|---|
|  |  |  |  | 25 | 26 | 27 | 28 | 29 | 30 | 31 | 32 |
| Polymer sheet composition | First layer | Formulation (% by mass)(*9) | IIR/NR(*1) | — | — | — | — | — | — | — | — |
|  |  |  | Filler(*2) | — | — | — | — | — | — | — | — |
|  |  |  | SIBS(*3) | 60 | 60 | 60 | 60 | 100 | 100 | 100 | 60 |
|  |  |  | Polyisobutylene(*8) | 40 | 40 | 40 | 40 | — | — | — | 40 |
|  |  |  | Naphthenic oil(*5) | — | — | — | — | — | — | — | — |
|  |  | Layer thickness (mm) |  | 0.3 | 0.2 | 0.2 | 0.2 | 0.2 | 0.2 | 0.2 | 0.2 |
|  | Second layer | Formulation (% by mass) | SIS(*6) | — | 100 | — | 100 | 60 | — | 60 | 60 |
|  |  |  | SIB(*7) | — | — | 100 | — | — | 60 | — | — |
|  |  |  | Polyisobutylene(*8) | — | — | — | — | 40 | 40 | 40 | 40 |
|  |  |  | Naphthenic oil(*5) | — | — | — | — | — | — | — | — |
|  |  | Layer thickness (mm) |  | — | 0.1 | 0.1 | 0.05 | 0.1 | 0.1 | 0.05 | 0.05 |
|  | Third layer | Formulation (% by mass) | SIS(*6) | — | — | — | — | — | — | — | — |
|  |  |  | SIB(*7) | — | — | — | 100 | — | — | 60 | 60 |
|  |  |  | Polyisobutylene(*8) | — | — | — | — | — | — | 40 | 40 |
|  |  |  | Naphthenic oil(*5) | — | — | — | — | — | — | — | — |
|  |  | Layer thickness (mm) |  | — | — | — | 0.05 | — | — | 0.05 | 0.05 |
| Performance evaluation | Polymer sheet test | Vulcanization adhesive strength index |  | 152 | 167 | 167 | 167 | 159 | 159 | 159 | 170 |
|  | Tire test | Presence or absence of air-in portions |  | B | B | B | B | B | B | B | B |
|  |  | Flex crack growth index |  | 132 | 129 | 129 | 129 | 110 | 110 | 110 | 129 |
|  |  | Rolling resistance index |  | 102 | 102 | 102 | 102 | 105 | 105 | 105 | 102 |
|  |  | Static air pressure drop rate (%/month) |  | 2.4 | 2.6 | 2.6 | 2.6 | 2.6 | 2.6 | 2.6 | 2.6 |
| Overall judgment |  |  |  | A | A | A | A | A | A | A | A |

TABLE 6

| | | | | Comparative Examples | | | | | | | |
|---|---|---|---|---|---|---|---|---|---|---|---|
| | | | | 28 | 29 | 30 | 31 | 32 | 33 | 34 | 35 |
| Polymer sheet composition | First layer | Formulation (% by mass)(*9) | IIR/NR(*1) | 99.6 | — | — | — | — | — | — | — |
| | | | Filler(*2) | 60 | — | — | — | — | — | — | — |
| | | | SIBS(*3) | — | 99.6 | 99.6 | 99.6 | 99.6 | 100 | 100 | 100 |
| | | | Polyisobutylene(*8) | 0.4 | 0.4 | 0.4 | 0.4 | 0.4 | — | — | — |
| | | | Naphthenic oil(*5) | — | — | — | — | — | — | — | — |
| | | Layer thickness (mm) | | 0.5 | 0.3 | 0.2 | 0.2 | 0.2 | 0.2 | 0.2 | 0.2 |
| | Second layer | Formulation (% by mass) | SIS(*6) | — | — | 100 | — | 100 | 99.6 | — | 99.6 |
| | | | SIB(*7) | — | — | — | 100 | — | — | 99.6 | — |
| | | | Polyisobutylene(*8) | — | — | — | — | — | 0.4 | 0.4 | 0.4 |
| | | | Naphthenic oil(*5) | — | — | — | — | — | — | — | — |
| | | Layer thickness (mm) | | — | — | 0.1 | 0.1 | 0.05 | 0.1 | 0.1 | 0.05 |
| | Third layer | Formulation (% by mass) | SIS(*6) | — | — | — | — | — | — | — | — |
| | | | SIB(*7) | — | — | — | — | 100 | — | — | 99.6 |
| | | | Polyisobutylene(*8) | — | — | — | — | — | — | — | 0.4 |
| | | | Naphthenic oil(*5) | — | — | — | — | — | — | — | — |
| | | Layer thickness (mm) | | — | — | — | — | 0.05 | — | — | 0.05 |
| Performance evaluation | Polymer sheet test | Vulcanization adhesive strength index | | 90 | 80 | 95 | 95 | 95 | 85 | 85 | 85 |
| | Tire test | Presence or absence of air-in portions | | C | C | C | C | C | C | C | C |
| | | Flex crack growth index | | 80 | 113 | 110 | 110 | 110 | 108 | 108 | 108 |
| | | Rolling resistance index | | 98 | 104 | 104 | 104 | 104 | 104 | 104 | 104 |
| | | Static air pressure drop rate (%/month) | | 4.0 | 1.7 | 1.9 | 1.9 | 1.9 | 1.9 | 1.9 | 1.9 |
| Overall judgment | | | | B | B | B | B | B | B | B | B |

| | | | | Comparative Examples | | | | | |
|---|---|---|---|---|---|---|---|---|---|
| | | | | 36 | 37 | 38 | 39 | 40 | 41 |
| Polymer sheet composition | First layer | Formulation (% by mass)(*9) | IIR/NR(*1) | — | — | — | — | — | — |
| | | | Filler(*2) | — | — | — | — | — | — |
| | | | SIBS(*3) | 99.6 | 55 | 55 | 55 | 55 | 55 |
| | | | Polyisobutylene(*8) | 0.4 | 45 | 45 | 45 | 45 | 45 |
| | | | Naphthenic oil(*5) | — | — | — | — | — | — |
| | | Layer thickness (mm) | | 0.2 | 0.3 | 0.2 | 0.2 | 0.2 | 0.2 |
| | Second layer | Formulation (% by mass) | SIS(*6) | 99.6 | — | 100 | — | 100 | 55 |
| | | | SIB(*7) | — | — | — | 100 | — | — |
| | | | Polyisobutylene(*8) | 0.4 | — | — | — | — | 45 |
| | | | Naphthenic oil(*5) | — | — | — | — | — | — |
| | | Layer thickness (mm) | | 0.05 | — | 0.1 | 0.1 | 0.05 | 0.05 |
| | Third layer | Formulation (% by mass) | SIS(*6) | — | — | — | — | — | — |
| | | | SIB(*7) | 99.6 | — | — | — | 100 | 55 |
| | | | Polyisobutylene(*8) | 0.4 | — | — | — | — | 45 |
| | | | Naphthenic oil(*5) | — | — | — | — | — | — |
| | | Layer thickness (mm) | | 0.05 | — | — | — | 0.05 | 0.05 |
| Performance evaluation | Polymer sheet test | Vulcanization adhesive strength index | | 97 | 157 | 171 | 171 | 171 | 174 |
| | Tire test | Presence or absence of air-in portions | | C | B | B | B | B | B |
| | | Flex crack growth index | | 110 | 157 | 152 | 152 | 152 | 152 |
| | | Rolling resistance index | | 104 | 99 | 99 | 99 | 99 | 99 |
| | | Static air pressure drop rate (%/month) | | 1.9 | 2.9 | 3.2 | 3.2 | 3.2 | 3.2 |
| Overall judgment | | | | B | B | B | B | B | B |

(*1) IIR/NR: implemented by blending IIR ("Exxon chlorobutyl 1068" manufactured by Exxon Mobil Corporation) and NR (TSR20) in a mass ratio 80:20

(*2) Filler: "SEAST V" manufactured by Tokai Carbon Co., Ltd. (N660, nitrogen-adsorption specific surface area: 27 m$^2$/g)

(*3) SIBS: "SIBSTAR 102T" manufactured by Kaneka Corporation (a styrene-isobutylene-styrene triblock copolymer, weight-average molecular weight of 100,000, styrene unit content of 25% by mass, Shore A hardness of 25)

(*4) Polybutene: "Nisseki Polybutene Grade HV300" manufactured by Nippon Oil Corporation (number-average molecular weight of 300)

(*5) Naphthenic oil: "Diana Process Oil NM280" manufactured by Idemitsu Kosan Co., Ltd.

(*6) SIS: D1161JP manufactured by Kraton Polymers LLC (a styrene-isoprene-styrene triblock copolymer, weight-average molecular weight of 150,000, styrene unit content of 15% by mass)

(*7) SIB: SIB prepared by the above-described method of preparing SIB (a styrene-isobutylene diblock copolymer, weight-average molecular weight of 70,000, styrene unit content of 15% by mass)

(*8) Polyisobutylene: "Tetrax 3T" manufactured by Nippon Oil Corporation (weight-average molecular weight of 49,000, viscosity-average molecular weight of 30,000)

(*9) The ingredient is expressed assuming the sum of IIR/NR, SIBS, polybutene, and naphthenic oil as 100% by mass. The formulation amount of the filler is expressed by a formulation ratio (% by mass) when the above sum is assumed as 100% by mass.

Example 1 is a polymer sheet composed of an SIBS layer containing 99.5% by mass of SIBS and 0.5% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 2 and 3 are polymer sheets of two-layered composition each including an SIBS layer containing 99.5% by mass of SIBS and 0.5% by mass of polybutene and an SIS layer or an SIB layer, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 4 is a polymer sheet of three-layered composition including an SIBS layer containing 99.5% by mass of SIBS and 0.5% by mass of polybutene, an SIS layer and an SIB layer, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 5 and 6 are polymer sheets of two-layered composition each including an SIBS layer and an SIS layer containing 99.5% by mass of SIS and 0.5% by mass of polybutene or an SIB layer containing 99.5% by mass of SIB and 0.5% by mass of polybutene, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 7 shows a polymer sheet of three-layered composition including an SIBS layer, an SIS layer containing 99.5% by mass of SIS and 0.5% by mass of polybutene, and an SIB layer containing 99.5% by mass of SIB and 0.5% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 8 shows a polymer sheet of three-layered composition including an SIBS layer containing 99.5% by mass of SIBS and 0.5% by mass of polybutene, an SIS layer containing 99.5% by mass of SIS and 0.5% by mass of polybutene, and an SIB layer containing 99.5% by mass of SIB and 0.5% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 9 is a polymer sheet composed of an SIBS layer containing 60% by mass of SIBS and 40% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 10 and 11 are polymer sheets of two-layered composition each including an SIBS layer containing 60% by mass of SIBS and 40% by mass of polybutene and an SIS layer or an SIB layer, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 12 is a polymer sheet of three-layered composition including an SIBS layer containing 60% by mass of SIBS and 40% by mass of polybutene, an SIS layer and an SIB layer, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 13 and 14 are polymer sheets of two-layered composition each including an SIBS layer and an SIS layer containing 60% by mass of SIS and 40% by mass of polybutene or an SIB layer containing 60% by mass of SIB and 40% by mass of polybutene, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 15 shows a polymer sheet of three-layered composition including an SIBS layer, an SIS layer containing 60% by mass of SIS and 40% by mass of polybutene, and an SIB layer containing 60% by mass of SIB and 40% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 16 shows a polymer sheet of three-layered composition including an SIBS layer containing 60% by mass of SIBS and 40% by mass of polybutene, an SIS layer containing 60% by mass of SIS and 40% by mass of polybutene, and an SIB layer containing 60% by mass of SIB and 40% by mass of polybutene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Comparative Example 1 is a conventional example, which is a polymer sheet containing IIR, NR, a filler, and a naphthenic oil, and a pneumatic tire with the polymer sheet used for the inner liner part. The conventional example is insufficient in performance related to static air pressure drop rate.

Comparative Example 2 is a polymer sheet composed of 100% by mass of SIBS, and a pneumatic tire with the polymer sheet used for the inner liner part. This comparative example presented a much weaker adhesive strength and a greater number of air-in portions than Comparative Example 1. Performance in flex crack growth resistance, rolling resistance, and static air pressure drop rate was improved.

Comparative Examples 3 and 4 are polymer sheets of two-layered composition each including an SIBS layer and an SIS layer or an SIB layer, and pneumatic tires with the polymer sheet used for the inner liner part. It is to be noted that none of the SIBS layer, the SIS layer and the SIB layer contains polybutene. These comparative examples presented a much weaker adhesive strength and a greater number of air-in portions than Comparative Example 1. Performance in flex crack growth resistance, rolling resistance, and static air pressure drop rate was improved.

Comparative Example 5 is a polymer sheet of three-layered composition including an SIBS layer, an SIS layer and an SIB layer, and a pneumatic tire with the polymer sheet used for the inner liner part. It is to be noted that none of the SIBS layer, the SIS layer and the SIB layer contains polybutene. This comparative example presented a much weaker adhesive strength and a greater number of air-in portions than Comparative Example 1. Performance in flex crack growth resistance, rolling resistance, and static air pressure drop rate was improved.

Comparative Example 6 is a polymer sheet containing an SIBS and a naphthenic oil, and a pneumatic tire with the polymer sheet used for the inner liner part. This comparative example presented a much weaker adhesive strength and a greater number of air-in portions than Comparative Example 1. Performance in flex crack growth resistance, rolling resistance, and static air pressure drop rate was improved.

Comparative Examples 7 and 8 are polymer sheets of two-layered composition each including an SIBS layer containing a naphthenic oil and an SIS layer or an SIB layer, and pneumatic tires with the polymer sheet used for the inner liner part. These comparative examples presented a much weaker adhesive strength and a greater number of air-in portions than Comparative Example 1. Performance in flex crack growth resistance, rolling resistance, and static air pressure drop rate was improved.

Comparative Example 9 is a polymer sheet of three-layered composition including an SIBS layer containing a naphthenic oil, an SIS layer and an SIB layer, and a pneumatic tire with the polymer sheet used for the inner liner part. This comparative example presented a much weaker adhesive strength and a greater number of air-in portions than Comparative Example 1. Performance in flex crack growth resistance, rolling resistance, and static air pressure drop rate was improved.

Comparative Examples 10 and 11 are polymer sheets of two-layered composition each including an SIBS layer and an SIS layer containing a naphthenic oil or an SIB layer, and pneumatic tires with the polymer sheet used for the inner liner part. These comparative examples presented a much weaker adhesive strength and a greater number of air-in portions than Comparative Example 1. Performance in flex crack growth resistance, rolling resistance, and static air pressure drop rate was improved.

Comparative Example 12 is a polymer sheet of three-layered composition including an SIBS layer, an SIS layer containing a naphthenic oil and an SIB layer containing a naphthenic oil, and a pneumatic tire with the polymer sheet used for the inner liner part. This comparative example presented a much weaker adhesive strength and a greater number of air-in portions than Comparative Example 1. Performance in flex crack growth resistance, rolling resistance, and static air pressure drop rate was improved.

Comparative Example 13 is a polymer sheet containing IIR, NR, a filler, and polybutene, and a pneumatic tire with the polymer sheet used for the inner liner part. This comparative example presented a weaker adhesive strength and a greater number of air-in portions than Comparative Example 1. Performance in flex crack growth resistance and rolling resistance was degraded.

Comparative Example 14 is a polymer sheet composed of an SIBS layer containing 99.6% by mass of SIBS and 0.4% by mass of polybutene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Examples 15 and 16 are polymer sheets of two-layered composition each including an SIBS layer containing 99.6% by mass of SIBS and 0.4% by mass of polybutene and an SIS layer or an SIB layer, and pneumatic tires with the polymer sheet used for the inner liner part. These comparative examples presented a weaker adhesive strength and a greater number of air-in portions than Comparative Example 1. Performance in flex crack growth resistance, rolling resistance, and static air pressure drop rate was improved.

Comparative Example 17 is a polymer sheet of three-layered composition including an SIBS layer containing 99.6% by mass of SIBS and 0.4% by mass of polybutene, an SIS layer and an SIB layer, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Examples 18 and 19 are polymer sheets of two-layered composition each including an SIBS layer and an SIS layer containing 99.6% by mass of SIS and 0.4% by mass of polybutene or an SIB layer containing 99.6% by mass of SIB and 0.4% by mass of polybutene, and pneumatic tires with the polymer sheet used for the inner liner part. These comparative examples presented a weaker adhesive strength and a greater number of air-in portions than Comparative Example 1. Performance in flex crack growth resistance, rolling resistance, and static air pressure drop rate was improved.

Comparative Example 20 is a polymer sheet of three-layered composition including an SIBS layer, an SIS layer containing 99.6% by mass of SIS and 0.4% by mass of polybutene, and an SIB layer containing 99.6% by mass of SIB and 0.4% by mass of polybutene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Example 21 is a polymer sheet of three-layered composition including an SIBS layer containing 99.6% by mass of SIBS and 0.4% by mass of polybutene, an SIS layer containing 99.6% by mass of SIS and 0.4% by mass of polybutene, and an SIB layer containing 99.6% by mass of SIB and 0.4% by mass of polybutene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Example 22 is a polymer sheet composed of an SIBS layer containing 55% by mass of SIBS and 45% by mass of polybutene, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Comparative Examples 23 and 24 are polymer sheets of two-layered composition each including an SIBS layer containing 55% by mass of SIBS and 45% by mass of polybutene and an SIS layer or an SIB layer, and pneumatic tires with the polymer sheet used for the inner liner part. These comparative examples presented improved performance in adhesive strength, flex crack growth resistance, and static air pressure drop rate, and a similar number of air-in portions as compared to Comparative Example 1. Performance in rolling resistance was degraded.

Comparative Example 25 is a polymer sheet of three-layered composition including an SIBS layer containing 55% by mass of SIBS and 45% by mass of polybutene, an SIS layer and an SIB layer, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Comparative Example 26 is a polymer sheet of three-layered composition including an SIBS layer containing 55% by mass of SIBS and 45% by mass of polybutene, an SIS layer containing 55% by mass of SIS and 45% by mass of polybutene, and an SIB layer containing 55% by mass of SIB and 45% by mass of polybutene, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Comparative Example 27 is a polymer sheet of three-layered composition including an SIBS layer containing 60% by mass of SIBS and 40% by mass of a naphthenic oil, an SIS layer containing 60% by mass of SIS and 40% by mass of a naphthenic oil, and an SIB layer containing 60% by mass of SIB and 40% by mass of a naphthenic oil, and a pneumatic tire with the polymer sheet used for the inner liner part. This comparative example presented degraded performance in adhesive strength, flex crack growth resistance, rolling resistance, and static air pressure drop rate, and an increased number of air-in portions as compared to Comparative Example 1.

Example 17 is a polymer sheet composed of an SIBS layer containing 99.5% by mass of SIBS and 0.5% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 18 and 19 are polymer sheets of two-layered composition each including an SIBS layer containing 99.5% by mass of SIBS and 0.5% by mass of polyisobutylene and an SIS layer or an SIB layer, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 20 is a polymer sheet of three-layered composition including an SIBS layer containing 99.5% by mass of SIBS and 0.5% by mass of polyisobutylene, an SIS layer and an SIB layer, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 21 and 22 are polymer sheets of two-layered composition each including an SIBS layer and an SIS layer containing 99.5% by mass of SIS and 0.5% by mass of polyisobutylene or an SIB layer containing 99.5% by mass of SIB and 0.5% by mass of polyisobutylene, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 23 is a polymer sheet of three-layered composition including an SIBS layer, an SIS layer containing 99.5% by mass of SIS and 0.5% by mass of polyisobutylene, and an SIB layer containing 99.5% by mass of SIB and 0.5% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 24 is a polymer sheet of three-layered composition including an SIBS layer containing 99.5% by mass of SIBS and 0.5% by mass of polyisobutylene, an SIS layer containing 99.5% by mass of SIS and 0.5% by mass of polyisobutylene, and an SIB layer containing 99.5% by mass of SIB and 0.5% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 25 is a polymer sheet composed of an SIBS layer containing 60% by mass of SIBS and 40% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 26 and 27 are polymer sheets of two-layered composition each including an SIBS layer containing 60% by mass of SIBS and 40% by mass of polyisobutylene and an SIS layer or an SIB layer, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 28 is a polymer sheet of three-layered composition including an SIBS layer containing 60% by mass of SIBS and 40% by mass of polyisobutylene, an SIS layer and an SIB layer, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Examples 29 and 30 are polymer sheets of two-layered composition each including an SIBS layer and an SIS layer containing 60% by mass of SIS and 40% by mass of polyisobutylene or an SIB layer containing 60% by mass of SIB and 40% by mass of polyisobutylene, and pneumatic tires with the polymer sheet used for the inner liner part. These examples presented a similar number of air-in portions and improved performance in adhesive strength, flex crack growth resistance, rolling resistance, and static air pressure drop rate as compared to Comparative Example 1 of a conventional example.

Example 31 is a polymer sheet of three-layered composition including an SIBS layer, an SIS layer containing 60% by mass of SIS and 40% by mass of polyisobutylene, and an SIB layer containing 60% by mass of SIB and 40% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Example 32 is a polymer sheet of three-layered composition including an SIBS layer containing 60% by mass of SIBS and 40% by mass of polyisobutylene, an SIS layer containing 60% by mass of SIS and 40% by mass of polyisobutylene, and an SIB layer containing 60% by mass of SIB and 40% by mass of polyisobutylene, and a pneumatic tire with the polymer sheet used for the inner liner part. This example presented a similar number of air-in portions and improved performance in adhesive strength, flex crack growth resistance, rolling resistance, and static air pressure drop rate as compared to Comparative Example 1 of a conventional example.

Comparative Example 28 is a polymer sheet containing IIR, NR, a filler, and polyisobutylene, and a pneumatic tire with the polymer sheet used for the inner liner part. This comparative example presented an increased number of air-in portions, and degraded performance in adhesive strength, flex crack growth resistance and rolling resistance as compared to Comparative Example 1.

Comparative Example 29 is a polymer sheet composed of an SIBS layer containing 99.6% by mass of SIBS and 0.4% by mass of polyisobutylene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Examples 30 and 31 are polymer sheets of two-layered composition each including an SIBS layer containing 99.6% by mass of SIBS and 0.4% by mass of polyisobutylene and an SIS layer or an SIB layer, and pneumatic tires with the polymer sheet used for the inner liner part. These comparative examples presented a weaker adhesive strength and a greater number of air-in portions than Comparative Example 1. Performance in flex crack growth resistance, rolling resistance, and static air pressure drop rate was improved.

Comparative Example 32 is a polymer sheet of three-layered composition including an SIBS layer containing 99.6% by mass of SIBS and 0.4% by mass of polyisobutylene, an SIS layer and an SIB layer, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Examples 33 and 34 are polymer sheets of two-layered composition each including an SIBS layer and an SIS layer containing 99.6% by mass of SIS and 0.4% by mass of polyisobutylene or an SIB layer containing 99.6% by mass of SIB and 0.4% by mass of polyisobutylene, and pneumatic tires with the polymer sheet used for the inner liner part. These comparative examples presented a weaker adhesive strength and a greater number of air-in portions than Comparative Example 1. Performance in flex crack growth resistance, rolling resistance, and static air pressure drop rate was improved.

Comparative Example 35 is a polymer sheet of three-layered composition including an SIBS layer, an SIS layer containing 99.6% by mass of SIS and 0.4% by mass of polyisobutylene, and an SIB layer containing 99.6% by mass of SIB and 0.4% by mass of polyisobutylene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Example 36 is a polymer sheet of three-layered composition including an SIBS layer containing 99.6% by mass of SIBS and 0.4% by mass of polyisobutylene, an SIS layer containing 99.6% by mass of SIS and 0.4% by mass of polyisobutylene, and an SIB layer containing 99.6% by mass of SIB and 0.4% by mass of polyisobutylene, and a pneumatic tire with the polymer sheet used for the inner liner part. This comparative example presented a weaker adhesive strength and a greater number of air-in portions than Comparative Example 1. Performance in flex crack growth resistance, rolling resistance, and static air pressure drop rate was improved.

Comparative Example 37 is a polymer sheet composed of an SIBS layer containing 55% by mass of SIBS and 45% by mass of polyisobutylene, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Comparative Examples 38 and 39 are polymer sheets of two-layered composition each including an SIBS layer containing 55% by mass of SIBS and 45% by mass of polyisobutylene and an SIS layer or an SIB layer, and pneumatic tires with the polymer sheet used for the inner liner part. These comparative examples presented improved performance in adhesive strength, flex crack growth resistance, and static air pressure drop rate, and a similar number of air-in portions as compared to Comparative Example 1. Performance in rolling resistance was degraded.

Comparative Example 40 is a polymer sheet of three-layered composition including an SIBS layer containing 55% by mass of SIBS and 45% by mass of polyisobutylene, an SIS layer and an SIB layer, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Comparative Example 41 is a polymer sheet of three-layered composition including an SIBS layer containing 55% by mass of SIBS and 45% by mass of polyisobutylene, an SIS layer containing 55% by mass of SIS and 45% by mass of polyisobutylene, and an SIB layer containing 55% by mass of SIB and 45% by mass of polyisobutylene, and a pneumatic tire with the polymer sheet used for the inner liner part. This comparative example presented improved performance in adhesive strength, flex crack growth resistance, and static air pressure drop rate, and a similar number of air-in portions as compared to Comparative Example 1. Performance in rolling resistance was degraded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pneumatic tire comprising a polymer sheet for an inner liner part of said tire,
   wherein said polymer sheet comprises an SIBS layer containing more than or equal to 60% mass and less than or equal to 99.5% by mass of a styrene-isobutylene-styrene triblock copolymer, and an SIB layer containing a styrene-isobutylene diblock copolymer,
   said SIBS layer having a thickness more than or equal to 0.05 mm and less than or equal to 0.6 mm,
   said SIB layer having a thickness more than or equal to 0.01 mm and less than or equal to 0.3 mm, and
   said SIBS layer and said SIB layer containing more than or equal to 0.5% by mass and less than or equal to 40% by mass of a polymer obtained by polymerization of a monomer unit having 4 carbon atoms, wherein said polymer that is obtained by polymerization of the monomer unit having 4 carbon atoms is composed of at least one of polybutene and polyisobutylene, and
   said SIBS layer is arranged at a radial innermost side of said pneumatic tire.

2. The pneumatic tire in accordance with claim 1, wherein said SIB layer containing said polymer obtained by polymerization of a monomer unit having 4 carbon atoms is arranged in contact with a carcass layer of said pneumatic tire.

3. The pneumatic tire in accordance with claim 1, wherein said polymer obtained by polymerization of a monomer unit having 4 carbon atoms satisfies at least one of a number-average molecular weight of more than or equal to 300 and less than or equal to 3,000, a weight-average molecular weight of more than or equal to 700 and less than or equal to 100,000, and a viscosity-average molecular weight of more than or equal to 20,000 and less than or equal to 70,000.

4. The pneumatic tire in accordance with claim 1, wherein said styrene-isobutylene-styrene triblock copolymer has a weight-average molecular weight of more than or equal to 50,000 and less than or equal to 400,000 and a styrene unit content of more than or equal to 10% by mass and less than or equal to 30% by mass.

5. The pneumatic tire in accordance with claim 1, wherein said styrene-isobutylene diblock copolymer is linear and has a weight-average molecular weight of more than or equal to 40,000 and less than or equal to 120,000 and a styrene unit content of more than or equal to 10% by mass and less than or equal to 35% by mass.

6. A pneumatic tire comprising a polymer sheet for an inner liner part of said tire,
   wherein said polymer sheet comprises an SIBS layer containing more than or equal to 60% by mass and less than or equal to 99.5% by mass of a styrene-isobutylene-styrene triblock copolymer, a SIS layer containing a styrene-isoprene-styrene triblock copolymer, and an SIB layer containing a styrene-isobutylene diblock copolymer,
   wherein said SIBS layer has a thickness more than or equal to 0.05 mm and less than or equal to 0.6 mm,
   said SIS layer and said SIB layer have a total thickness more than or equal to 0.01 mm and less than or equal to 0.3 mm,
   said SIBS layer, and at least one of said SIS layer and said SIB layer contain more than or equal to 0.5% by mass and less than or equal to 40% by mass of a polymer obtained by polymerization of a monomer unit having 4 carbon atoms,
   said polymer obtained by polymerization of a monomer unit having 4 carbon atoms is composed of at least one of polybutene and polyisobutylene, and
   said SIBS layer is arranged at a radial innermost side of said pneumatic tire.

7. The pneumatic tire in accordance with claim 6, wherein one of said SIS layer containing said polymer obtained by polymerization of a monomer unit having 4 carbon atoms and said SIB layer containing said polymer obtained by polymerization of a monomer unit having 4 carbon atoms is arranged in contact with a carcass layer of said pneumatic tire.

8. The pneumatic tire in accordance with claim 6, wherein said polymer obtained by polymerization of a monomer unit having 4 carbon atoms satisfies at least one of a number-average molecular weight of more than or equal to 300 and less than or equal to 3,000, a weight-average molecular weight of more than or equal to 700 and less than or equal to 100,000, and a viscosity-average molecular weight of more than or equal to 20,000 and less than or equal to 70,000.

9. The pneumatic tire in accordance with claim 6, wherein said styrene-isobutylene-styrene triblock copolymer has a weight-average molecular weight of more than or equal to 50,000 and less than or equal to 400,000 and a styrene unit content of more than or equal to 10% by mass and less than or equal to 30% by mass.

10. The pneumatic tire in accordance with claim 6, wherein said styrene-isoprene-styrene triblock copolymer has a weight-average molecular weight of more than or equal to 100,000 and less than or equal to 290,000 and a styrene unit content of more than or equal to 10% by mass and less than or equal to 30% by mass.

11. The pneumatic tire in accordance with claim 6, wherein said styrene-isobutylene diblock copolymer is linear and has a weight-average molecular weight of more than or equal to 40,000 and less than or equal to 120,000 and a styrene unit content of more than or equal to 10% by mass and less than or equal to 35% by mass.

* * * * *